United States Patent [19]

Pratap

[11] 4,445,392
[45] May 1, 1984

[54] OVERSPEED TRIP MECHANISM
[75] Inventor: Prem Pratap, Holden, Mass.
[73] Assignee: Coppus Engineering Corporation, Worcester, Mass.
[21] Appl. No.: 340,197
[22] Filed: Jan. 18, 1982
[51] Int. Cl.³ .......................... F16H 5/42; G05G 17/00
[52] U.S. Cl. ........................................... 74/3; 73/548; 200/80 R
[58] Field of Search ............... 73/548; 74/3, 3.2; 137/57; 200/80 R

[56] References Cited
U.S. PATENT DOCUMENTS

| | | | |
|---|---|---|---|
| 960,411 | 6/1910 | Samuelson | 73/548 |
| 1,076,472 | 10/1913 | Wilkinson | 73/548 X |
| 2,254,520 | 9/1941 | Garrott | 73/548 X |
| 2,333,044 | 10/1943 | Rosch | 73/548 |
| 2,388,282 | 11/1945 | Otto | 73/548 X |
| 2,831,671 | 4/1958 | Leonard | 73/548 X |

*Primary Examiner*—Allan D. Hermann
*Attorney, Agent, or Firm*—Thompson, Birch, Gauthier & Samuels

[57] ABSTRACT

An overspeed trip mechanism for a rotating shaft has a collar mounted on the shaft. An eccentric ring surrounds and is connected to the collar for rotation therewith. A trip member is located exteriorly of the collar. The eccentric ring is movable radially relative to the collar between a first position spaced from the trip member and a second position in contact therewith. A spring is arranged between the ring and the collar to yieldably urge the ring into its first position.

6 Claims, 3 Drawing Figures

OVERSPEED TRIP MECHANISM

BACKGROUND OF THE INVENTION

1. Field of the Invention

This invention relates to an overspeed trip mechanism for a rotary shaft which typically comprises the output shaft of a steam turbine.

2. Description of the Prior Art

Turbine overspeed trip mechanisms are well known in the art. Conventionally, installation of such mechanisms entails precise drilling and/or machining of the shafts on which they are mounted. This usually makes it impractical to attempt "retrofitting" turbines in the field with new and improved trip mechanisms, because in order to do so, the turbines must be dismantled in order to gain proper access to the turbine shafts.

SUMMARY OF THE INVENTION

The present invention has as one of its primary objectives the provision of an improved overspeed trip mechanism which can be axially mounted on a turbine shaft or the like without the need to resort to expensive and time consuming machining operations.

A further objective of the present invention is the provision of a highly reliable yet relatively inexpensive trip mechanism which can be rapidly installed on existing equipment in the field.

In a preferred embodiment to be described hereinafter in greater detail, an overspeed trip mechanism in accordance with the present invention includes a collar adapted to be axially received on and fixed relative to a shaft. An eccentric ring surrounds and is connected to the collar for rotation therewith. A trip member of conventional design is located exteriorly of the collar. The eccentric ring is movable radially with respect to the collar between a first position spaced from the trip member and a second position in contact therewith. A spring member is arranged between the eccentric ring and the collar to urge the ring into its first position. At a selected rotational speed of the shaft, the spring yields to centrifugal force and allows the eccentric ring to shift radially to its second position, thereby activating the trip member.

BRIEF DESCRIPTION OF THE DRAWINGS

A more detailed description of the present invention will now be provided by referring to the accompanying drawings, wherein.

DETAILED DESCRIPTION OF PREFERRED EMBODIMENT

Figure 1:
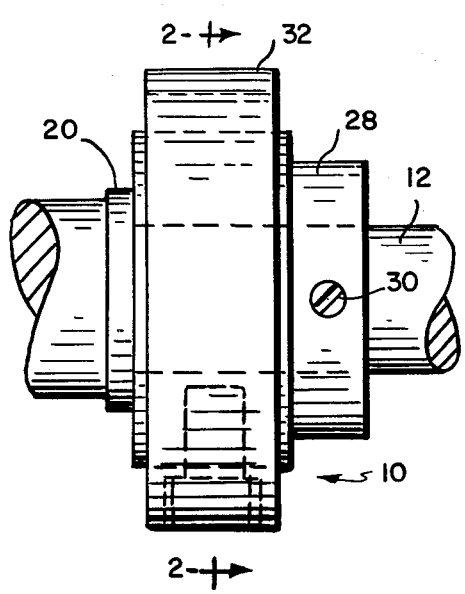
FIG. 1 is a side elevational view of an overspeed trip mechanism in accordance with the present inventon.

Referring now to the drawings, an overspeed trip mechanism in accordance with the present invention is shown at 10 mounted on a shaft 12. This trip mechanism includes a collar 14 having a first cylindrical axial bore 16 arranged concentrically with respect to a cylindrical first external surface 18. The bore 16 is appropriately dimensioned to allow the collar 14 to be axially received on the shaft 12 where it is located against a stop such as for example a shoulder 20. The bore 16 has a keyway 22 which cooperates with a mating keyway 24 on the shaft to receive a key 26 which serves as a means for fixing the collar relative to the shaft for rotation therewith. The collar 14 is held axially against shoulder 20 by any convenient means, for example, a second retainer collar 28 having a set screw 30 which can be tightened to press against the shaft 12.

Figure 2:
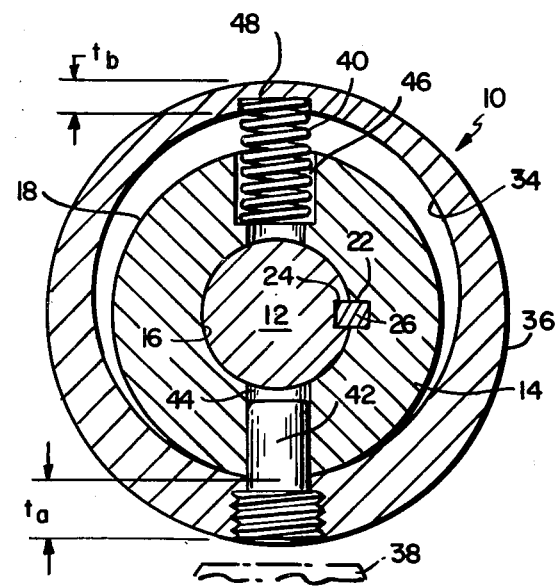
FIG. 2 is a sectional view taken along line 2—2 of FIG. 1, showing the eccentric ring in its first position spaced from an exteriorily located trip member.
Figure 3:
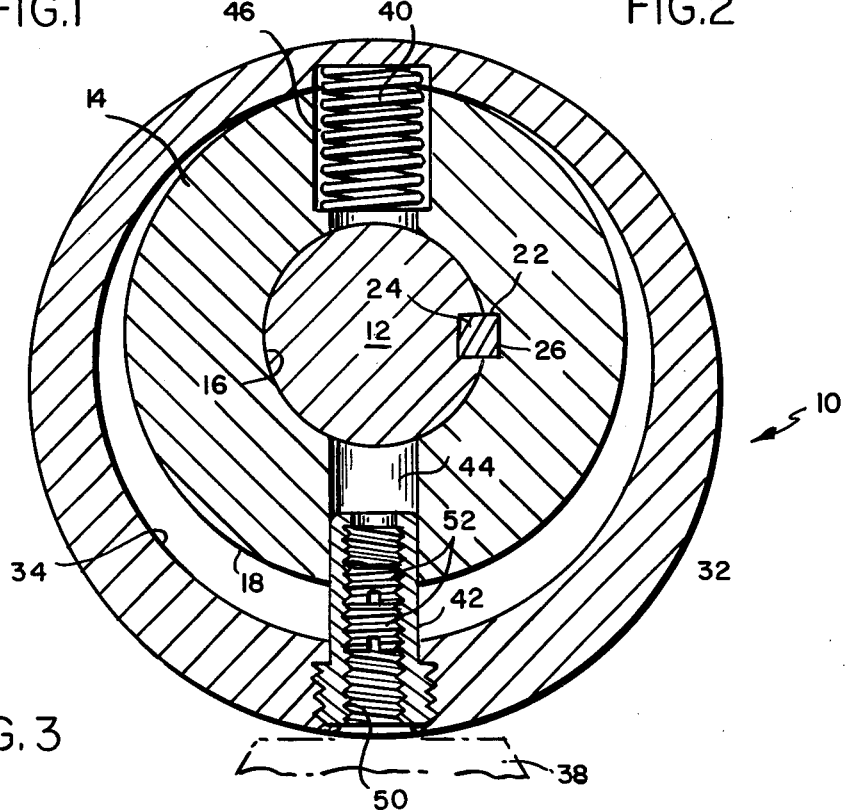
FIG. 3 is a view on an enlarged scale similar to FIG. 2, showing the eccentric ring in its second position in contact with the trip member.

A ring 32 surrounds the collar 14. The ring has a cylindrical second axial bore 34 and a second external surface 36. A trip member 38 of any conventional design known to those skilled in the art is arranged externally of the ring 32. The diameter of the second axial bore 34 is greater than that of the first external surface 18 on collar 14, thus enabling the ring to shift radially relative to the collar between a first position spaced radially from the trip member 38 as shown in FIG. 2, and a second position contacting the trip member as shown in FIG. 3. The second axial bore 34 is arranged eccentrically with respect to the second external surface 36 to define diametrically opposed maximum and minimum ring wall thicknesses $t_a$, $t_b$ (see FIG. 2).

A resilient means in the form of a coiled compression spring 40 is arranged between the ring 32 and the collar 14 on one side of the axial bore 16. A guide means in the form of a pin member 42 is arranged on the opposite side of the bore 16 in radial alignment with the spring 40. The pin member 42 protrudes radially inwardly from the ring 32 and is slidably received in a first radial bore 44 in the collar 14. The pin member 42 thus serves to prevent rotation of the ring 32 relative to the collar 14, while also guiding the ring in its radial movement relative to the collar between its previously described first and second positions. Preferably, the pin member 42 is located at the maximum wall thickness $t_a$ of the ring 32.

The spring 40 is received in a second stepped radial bore 46 in the collar 14, and protrudes therefrom into a relatively shallow blind bore 48 in the axial bore 34 at the area of minimum ring thickness $t_b$. The spring 40 urges the ring 32 radially into its first position as shown in FIG. 1, and its compressive force is of a magnitude sufficient to oppose centrifugal forces acting on the ring and to maintain the ring in that position while the shaft 12 is rotating within an acceptable speed range. However, if the rotational speed of the shaft 12 exceeds the upper limit of this acceptable range, then the magnitude of centrifugal force acting on the ring 32 will overcome the opposing compressive force of spring 40, and the ring will shift to its second position as shown in FIG. 3, thus engaging the trip member 38.

Preferably, the pin 42 is internally threaded as at 50 to accept a pair of set screws 52. By radially adjusting the set screws 52 in the threaded bore 50 of pin 42, the mechanism can be fine tuned to trip at selected rotational speed.

It will thus be seen that a trip mechanism in accordance with the present invention can be easily and rapidly mounted on a shaft by simply axially locating the internal collar 14 at the proper location. The collar can be held against an integral shoulder 20 on the shaft by another collar 28, or if need be, it can be held between a pair of collars 28. In any event, precise machining of the shaft 12 is not required, thus making it possible to retrofit the trip mechanism 10 onto turbines already in the field.

It is my intention to cover all changes and modifications of the embodiment herein chosen for purposes of disclosure which do not depart from the scope of the claims appended hereto.

I claim:

1. An overspeed trip mechanism for a rotating shaft, comprising:

a collar having a cylindrical first axial bore arranged concentrically with respect to a cylindrical first external surface, said collar being arranged to be received coaxially on the shaft;

means for fixing said collar relative to the shaft for rotation therewith;

a ring surrounding and connected to said collar for rotation therewith, said ring having a cylindrical second axial bore and a cylindrical second external surface, the diameter of said second axial bore being greater than the diameter of said first external surface, said second axial bore being arranged eccentrically with respect to said second external surface to define diametrically opposed maximum and minimum ring wall thickness;

a trip member arranged exteriorly of said ring;

resilient means arranged between said ring and said collar on one side of said first axial bore for urging said ring radially in one direction into a first position at which said second external surface is spaced radially from said trip member and arranged concentrically with respect to said first axial bore and the shaft axis, said resilient means being adapted to yield to a selected level of centrifugal force developed during rotation of said ring and collar with the shaft and to accommodate a radial shifting of said ring relative to said collar in a direction opposite to said one direction to a second position at which said second external surface contacts said trip member; and guide means for radially directing the movement of said ring relative to said collar between said first and second positions, said guide means comprising a first radial bore in said collar and a pin member protruding radially inwardly from said ring to be slidably received in said first radial bore, said resilient means comprising a compression spring received in a second radial bore in said collar and protruding therefrom into contact with the interior of said ring.

2. The trip mechanism of claim 1 wherein said guide means is arranged to prevent rotation of said ring relative to said collar.

3. The trip mechanism of claim 2 wherein said guide means is arranged on the opposite side of said first axial bore.

4. The trip mechanism of claim 1 wherein said first and second radial bores are aligned axially and arranged on opposite side of said first axial bore.

5. The trip mechanism of claim 4 wherein said pin member is located at the maximum thickness of the ring wall, and said compression spring contacts the interior of sid ring at its minimum wall thickness.

6. The trip mechanism of claim 1 further comprising a third radial bore in said pin member, said third radial bore being internally threaded and having at least one screw member threaded therein.

* * * * *